Patented July 10, 1951

2,560,041

UNITED STATES PATENT OFFICE 2,560,041

DISPERSIONS OF PIGMENTS IN SYNTHETIC LATICES OF RUBBERLIKE MATERIALS

Rexford E. Draman, Akron, Ohio, assignor to The Firestone Tire & Rubber Company, Akron, Ohio, a corporation of Ohio No Drawing. Application December 6, 1945, Serial No. 633,260

1 Claim. (Cl. 260—17.5)

This invention relates to the use of lignin as a dispersing agent for water slurries of pigments, such as carbon black, zinc oxide, etc., for incorporation in synthetic latices or rubber-like materials.

In the compounding of pigments in latices which are to be later coagulated to obtain a processable rubber-like coagulum, it is necessary that the dispersion be one which produces a coagulum which retains the pigments. For instance, in the production of a coagulum which contains carbon black, it is essential that the carbon black be embodied in the coagulum so that it is retained in the coagulum throughout the subsequent processing steps. Lignin gives such a coagulum. Any of the usual coagulating agents may be used, such as aluminum sulfate, sulfuric acid (of any suitable strength), sodium chloride, etc.

To prepare a dispersing solution from a lignin, it is reacted with sodium hydroxide to produce a solution of the sodium salts which may, for example, have a pH of about 9. The term "lignin" is used herein to refer to both acid lignins and the sodium salts. With an acid coagulant a purified lignin with a pH of less than seven is preferred. When other coagulants are used, an unpurified sodium salt of lignin may be used, such as Lignin KSC. In the following examples a purified acid, pine-wood lignin is used which is marketed as Lignin KSA. Lignin does not have the retarding effect on coagulation with aluminum sulfate experienced with other dispersing agents, such as the polymerized sodium salts of alkyl naphthalene sulfonic acids of which Daxad 11 and Tamol R and Triton 100 are representative.

Example 1

In this example the lignin used is Lignin KSA to which sufficient sodium hydroxide has been added to give a solution which will produce an insoluble product when added to a 1 per cent aqueous solution of aluminum sulfate. A 3 per cent aqueous solution of the treated Lignin KSA was used. It was prepared from:

| | Pounds |
|---|---|
| Water | 7846 |
| NaOH (79% aqueous dispersion) | 70 |
| Lignin KSA | 250 |

Then 942 gallons of this solution and 5200 gallons of water were used to disperse 9180 pounds of carbon black. The total solids of the black slurry (black+Lignin KSA+NaOH) was 15.66 per cent. In the dispersion 2.72 pounds Lignin KSA were used per 100 pounds of black.

The water slurry of black was run into a mixing tank simultaneously with latex of rubber-like copolymer of butadiene-1,3 and styrene (GR-S latex) of 25 to 26 per cent solids content. The flow rates of the slurry and latex were controlled to give a rubber with a carbon content of about 50±2 parts black on 100 parts GR-S. One per cent aluminum sulfate solution was used for coagulation. The density of the black-containing rubber obtained by filtering and drying the crumb ranged between 1.112 and 1.118. This crumb was compounded according to the following formula:

| | Parts by weight |
|---|---|
| Black-containing rubber | 900 |
| BRT-7 | 30 |
| Zinc oxide | 30 |
| Sulfur | 12 |
| Mercaptobenzothiazole | 9 |

BRT-7 is a heavy viscous liquid coal-tar plasticizer having a specific gravity between 1.20 and 1.25 at 25° C., having an Engler viscosity of 120 to 200 seconds for 100 cc. at 100° C. and having a zero percent distillation at 270° C. and a maximum distillation of 25% at 300° C.

The material was cured in the standard manner at 292° F. for the various periods expressed parenthetically in minutes in the following table. Its properties are compared in the following table with those of a control similarly compounded, except that Daxad 11 was used as the dispersing agent instead of lignin:

| | Sample | Control |
|---|---|---|
| Plasticity (Mooney L4) | 56 | 58 |
| Elongation: | | |
| (25') | 810 | 800 |
| (50') | 700 | 710 |
| (90') | 625 | 650 |
| 300% Modulus: | | |
| (25') | 235 | 175 |
| (50') | 700 | 635 |
| (90') | 1,050 | 950 |
| 500% Modulus: | | |
| (25') | 575 | 420 |
| (50') | 1,075 | 1,310 |
| (90') | 2,200 | 2,015 |
| Tensile: | | |
| (25') | 1,000 | 690 |
| (50') | 2,525 | 2,115 |
| (90') | 3,100 | 2,835 |

The vulcanized product has good physical properties. The black was firmly held by the coagulum. No difficulty was experienced in producing or handling the slurry dispersion of black or the black-containing latex. It filtered well. This indicates that the lignin dispersion was very stable and satisfactory. The coagulation occurred more rapidly than when the usual dispersing agents are used. Slower agitation during the coagulation increased the size of the crumb and made it more processable. The crumb obtained with agitation using a 10-inch marine-type blade (400 R. P. M.) in a 400-gallon tank was dewatered on an Oliver filter, shredded, and dried satisfactorily in a single-pass, forced-draft, 50-foot Proctor and Swartz drier at 250° F.

*Example 2*

|  | Pounds |
|---|---|
| Water | 200 |
| NaOH (79%) | 0.25 |
| Lignin KSA | 1.50 |
|  | 201.75 |

The lignin was advantageously added to half the water and the caustic until thoroughly dissolved. The balance of the water was then added. Fifty pounds of carbon were then added slowly to the dispersion with vigorous agitation.

The resulting dispersion (251.75 pounds) was then mixed with 387 pounds GR-S (25.8 per cent total solids) by running the two into a mixing tank with mild agitation with a 3-horsepower lightning agitator.

The resulting latex was then coagulated with acid prepared as follows:

|  | Pounds |
|---|---|
| Water | 414.32 |
| Sulfuric acid (95.5%) | 2.18 |

The two solutions may be mixed in any usual manner, as, for example, on a continuous basis in a coagulating tank. In the example, the latex, recycle acid (obtained from dewatered crumb), and acid solution were continuously added to a 22-gallon tank equipped with a paddle type agitator rotating at 80 R. P. M. The rates of flow of the latex, recycle acid, and acid solution were 1.5, 3.5, and .26 to .34 gallon per minute, respectively. The pH of the coagulating tank was 3, and its temperature about 135° F. The slurry was then passed through a holding tank at such a rate that the total holding time in the two tanks was about 7.54 minutes. The production of black rubber was 3.7 pounds per minute.

The resulting dried crumb was compounded according to the above formula and then cured at 292° F. for the periods given parenthetically in the following table which records the results of tests on samples not washed on the filter and samples washed on the filter and compares them with the properties of GR-S coagulated with aluminum sulfate in which carbon black was incorporated on a mill:

|  | No Wash | Washed | Control |
|---|---|---|---|
| Elongation: |  |  |  |
| (25′) | 720 | 770 | 815 |
| (50′) | 620 | 665 | 700 |
| (90′) | 530 | 600 | 650 |
| 300% Modulus: |  |  |  |
| (25′) | 420 | 400 | 300 |
| (50′) | 915 | 840 | 665 |
| (90′) | 1,315 | 1,250 | 1,000 |
| 500% Modulus: |  |  |  |
| (25′) | 890 | 865 | 675 |
| (50′) | 1,935 | 1,835 | 1,540 |
| (90′) | 2,675 | 2,565 | 2,175 |
| Tensile: |  |  |  |
| (25′) | 1,270 | 1,455 | 1,225 |
| (50′) | 2,475 | 2,670 | 2,475 |
| (90′) | 2,860 | 3,195 | 3,185 |

In the one run the pH was 2; in another it was 3. Both were satisfactory. The pH should be kept low, for example, from about 1 to 4, or preferably about 2.5 to 3.5. Acidification of the lignin causes its precipitation, and this appears to account for the very satisfactory coagulation obtained with sulfuric acid.

Although in describing the invention, particular reference has been made to the addition of dispersions to GR-S latices, it applies equally to the addition of pigments to latices of rubber-like copolymer of butadiene and acrylonitrile and other latices of other rubber-like copolymers and polymers, etc. The conditions may be varied as required. In general, it may be said that the amount of lignin used will be about 1 to 5 parts per 100 pounds of rubber.

What I claim is:

The process of compounding a synthetic latex of a rubber-like copolymer of butadiene-1,3 and styrene which comprises mixing therewith a water slurry of an alkaline lignin dispersion of carbon black, the lignin amounting to about 1 to 5 parts per 100 parts of said copolymer and then coagulating with aluminum sulfate to produce a coagulum with the carbon black embodied therein.

REXFORD E. DRAMAN.

REFERENCES CITED

The following references are of record in the file of this patent:

UNITED STATES PATENTS

| Number | Name | Date |
|---|---|---|
| 2,343,368 | Daly | Mar. 7, 1944 |
| 2,353,568 | King | July 11, 1944 |
| 2,355,180 | Remy | Aug. 18, 1944 |
| 2,381,248 | Bascom | Aug. 7, 1945 |